United States Patent [19]

Dauth et al.

[11] Patent Number: 5,593,787
[45] Date of Patent: Jan. 14, 1997

[54] ORGANOSILICON COMPOUNDS CONTAINING (METH) ACRYLOXY GROUPS, THEIR PREPARATION AND THEIR USE

[75] Inventors: Jochen Dauth, Burghausen; Christian Herzig, Taching am See; Bernward Deubzer; Thomas Hierstetter, both of Burghausen; Petra Gratzl, Tüsling, all of Germany

[73] Assignee: Wacker-Chemie GmbH, Munich, Germany

[21] Appl. No.: 548,127

[22] Filed: Oct. 25, 1995

[30] Foreign Application Priority Data

Dec. 8, 1994 [DE] Germany .................. 44 43 749.8

[51] Int. Cl.$^6$ .................................... B32B 9/04
[52] U.S. Cl. .................. 428/447; 556/440; 556/437; 556/445; 522/99; 528/26; 528/12; 528/32
[58] Field of Search ................... 556/445, 440, 556/437; 522/99; 528/26, 32, 12; 428/447

[56] References Cited

U.S. PATENT DOCUMENTS

| | | | |
|---|---|---|---|
| 4,292,434 | 9/1981 | Lindner et al. | 556/479 |
| 4,405,208 | 9/1983 | Shirai | 350/341 |
| 4,777,233 | 10/1988 | Suzuki et al. | 528/32 |
| 4,908,274 | 3/1990 | Jachmann et al. | 428/452 |
| 4,940,766 | 7/1990 | Gay et al. | 528/18 |
| 5,214,077 | 5/1993 | Herzig et al. | 522/99 |
| 5,250,647 | 10/1993 | Herzig | 528/15 |
| 5,446,119 | 8/1995 | Herzig et al. | 528/26 |
| 5,474,709 | 12/1995 | Herzig et al. | 252/321 |

FOREIGN PATENT DOCUMENTS

| | | |
|---|---|---|
| 0130731 | 1/1985 | European Pat. Off. . |
| 0110370 | 4/1987 | European Pat. Off. . |
| 0284863 | 10/1988 | European Pat. Off. . |
| 0503668 | 9/1992 | European Pat. Off. . |
| 0508491 | 10/1992 | European Pat. Off. . |
| 255737 | 4/1988 | Germany . |
| 298404 | 2/1992 | Germany . |
| 4032006 | 4/1992 | Germany . |
| 4325359 | 2/1995 | Germany . |
| WO92/05854 | 4/1992 | WIPO . |

OTHER PUBLICATIONS

English Derwent abstract AN 92-235184.
English Derwent abstract AN 88-250765.
English Derwent abstract AN 92-133035.
English Derwent Abstract AN 88-168780.

*Primary Examiner*—Margaret W. Glass

[57] ABSTRACT

The present invention relates to organosilicon compounds containing (meth)acryloxy groups which can be prepared in a simple manner with high selectivity using readily accessible starting substances. The organopolysiloxanes containing (meth)acryloxy groups rapidly crosslink in the presence of a photoinitiator and light. The compounds of the present invention may be employed in the production of coatings.

9 Claims, No Drawings

ORGANOSILICON COMPOUNDS CONTAINING (METH) ACRYLOXY GROUPS, THEIR PREPARATION AND THEIR USE

BACKGROUND OF INVENTION

According to U.S. Pat. No. 4,405,208, organopolysiloxanes containing acryloxy groups are obtained in a hydrosilylation reaction by reaction of organopolysiloxane containing Si-bonded hydrogen with propargyl (meth)acrylate. The propargyl alcohol employed for preparation of the propargyl (meth)acrylate has a relatively high toxicity, and the esterification of propargyl alcohol with (meth)acrylic acid gives poor yields.

The reaction of organopolysiloxane containing Si-bonded hydrogen with beta(allyloxy)ethyl methacrylate in the presence of a hydrosilylation catalyst is known from EP-A 130 731. Organopolysiloxanes containing methacryloxy groups are obtained in this reaction. Organopolysiloxanes containing acryloxy groups are not obtainable selectively by an analogous reaction, since hydrosilylation occurs both on the acrylic and on the allyl radical.

U.S. Pat. No. 5,214,077 describes the reaction of silanes and organopolysiloxanes containing Si-bonded hydrogen with alkynyloxy (meth)acrylates in the presence of a hydrosilylation catalyst. In this reaction, a maximum of one (meth)acrylic group is added on per Si atom.

DD-A 298 404 describes a process for the preparation of siloxanylalkenediyl bis(meth)acrylates. In this process, organopolysiloxane containing Si-bonded hydrogen is reacted with but-2-yne 1,4-dimethacrylate in the presence of a hydrosilylation catalyst. Toxic organic monomers, such as but-2-yne 1,4-dimethacrylate and but-2-yne-1,4-diol, from which the dimethacrylate is obtained by reaction with methacrylic acid, are employed.

It is known from U.S. Pat. No. 4,940,766 that polysiloxanes containing hydroxyalkyl groups can be given corresponding functionalization with (meth)acrylic acid ester groups by transesterification with (meth)acrylic acid alkyl esters under tin catalysis, making it possible for a Si atom to be substituted by a maximum of one functional group.

Siloxanyl-alkenediyl-bis-ω-hydroxypolyoxyalkylenes and their use as surfactants are known from DD-A 255 737. DE-A 40 32 006 describes defoamers based on such organopolysiloxanes.

SUMMARY OF THE INVENTION

The object of the present invention is to provide organosilicon compounds containing (meth)acryloxy groups which can be prepared in a simple process with a high selectivity using readily accessible starting substances which are less toxic than those used to date. Another object of the present invention is to provide organopolysiloxanes containing (meth)acryloxy groups which rapidly cross-link under the action of light, in which the photosensitizers employed during the crosslinking dissolve readily and achieve a higher conversion during the crosslinking, i.e., the content of unreacted (meth)acryloxy groups is lower than that achieved to date. Yet another object of the invention is to provide organopolysiloxanes containing (meth)acryloxy groups which can be employed for the production of coatings.

The present invention relates to organosilicon compounds containing (meth)acryloxy groups having units of the formula $$A_a R_b SiX_c O_{\frac{4-(a+b+c)}{2}}, \quad (I)$$

in which

R is identical or different and is a monovalent, optionally halogenated hydrocarbon radical having 1 to 18 carbon atom(s) per radical, X is identical or different and is a chlorine atom or a radical of the formula —OR$^1$, in which R$^1$ is an alkyl radical having 1 to 8 carbon atom(s) per radical, which can be substituted by an ether oxygen atom, a is 0 or 1, b is 0, 1, 2 or 3, c is 0, 1, 2 or 3 and the sum $a+b+c \leq 4$ and

A is a radical of the formula $$\begin{array}{c} O \\ \| \\ HCR^4(OR^3)_zOCCR^2=CH_2 \\ | \\ -CR^4(OR^3)_zOCCR^2=CH_2 \\ \| \\ O \end{array}$$

in which z is 1, 2, 3 or 4,

R$^2$ is a hydrogen atom or a methyl radical,

R$^3$ is a linear or branched alkylene radical having 1 to 6 carbon atom(s) per radical and R$^4$ is a linear or branched alkylene radical having 1 to 6 carbon atom(s) per radical, with the proviso that the compounds contain at least one radical A per molecule.

The present invention further relates to a process for the preparation of organosilicon compounds containing (meth)acryloxy groups, which comprises reacting organosilicon compounds (1) having units of the formula $$B_a R_b SiX_c O_{\frac{4-(a+b+c)}{2}}, \quad (II)$$

in which

R, X, a, b and c have the meaning given above

B is a radical of the formula $$\begin{array}{c} HCR^4(OR^3)_zOR^5 \\ | \\ -CR^4(OR^3)_zOR^5 \end{array}$$

in which z, R$^3$ and R$^4$ have the meaning given above and

R$^5$ is a hydrogen atom, a trimethylsilyl group or a tertiary butyl group, with the proviso that the compounds contain at least one radical B per molecule, with (meth)acrylic acid esters (2) of the formula $$\begin{array}{c} O \\ \| \\ H_2C=CR^2COR^6 \end{array}$$

in which

R$^2$ has the meaning given above and

R$^6$ is a monovalent hydrocarbon radical having 1 to 12 carbon atom(s) per radical, which can be substituted by an ether oxygen atom or a hydroxyl group, in the presence of catalysts (3) which promote the transesterification.

The present invention further relates to a process for the preparation of organosilicon compounds containing (meth)acryloxy groups, which comprises esterifying organosilicon compounds (1) having units of the formula

in which R, X, B, a, b and c have the meaning given above, with the proviso that the compounds contain at least one radical B per molecule, with (meth)acrylic acids in the presence of acid catalysts (4).

The organosilicon compounds according to the invention preferably have an average molecular weight of 500 to 1,000,000 g/mole, preferably 5,000 to 150,000 g/mole, and have a viscosity of 10 to 1,000,000 $mm^2 \cdot s^{-1}$ at 25° C., preferably 20 to 100,000 $mm^2 \cdot s^{-1}$ at 25° C.

Examples of radicals R are alkyl radicals, such as the methyl, ethyl, n-propyl, iso-propyl, 1-n-butyl, 2-n-butyl, iso-butyl, tert-butyl, n-pentyl, iso-pentyl, neo-pentyl and tert-pentyl radical, hexyl radicals, such as the n-hexyl radical, heptyl radicals, such as the n-heptyl radical, octyl radicals, such as the n-octyl radical and iso-octyl radicals, such as the 2,2,4-trimethylpentyl radical, nonyl radicals, such as the n-nonyl radical, decyl radicals, such as the n-decyl radical, dodecyl radicals, such as the n-dodecyl radical; octadecyl radicals, such as the n-octadecyl radical; cycloalkyl radicals, such as the cyclopentyl, cyclohexyl and cycloheptyl radicals and methylcyclohexyl radicals; aryl radicals, such as the phenyl, naphthyl and anthryl and phenanthryl radical; alkaryl radicals, such as o-, m- and p-tolyl radicals; xylyl radicals and ethylphenyl radicals; and aralkyl radicals, such as the benzyl radical and the α- and the β-phenylethyl radical. The methyl radical is preferred.

Examples of halogenated radicals R are haloalkyl radicals, such as the 3,3,3-trifluoro-n-propyl radical, the 2,2,2,2',2',2'-hexafluoroisopropyl radical and the heptafluoroisopropyl radical, and haloaryl radicals, such as the o-, m- and p-chlorophenyl radical.

Examples of alkyl radicals $R^1$ are methyl, ethyl, n-propyl, iso-propyl, 1-n-butyl, 2-n-butyl, iso-butyl and tert-butyl radicals. The methyl and ethyl radical are preferred. Examples of alkyl radicals $R^1$ which are substituted by an ether oxygen atom are the methhoxyethyl and the ethoxyethyl radical.

The radical $R^2$ is preferably a hydrogen atom.

Examples of radicals $R^3$ are alkylene radicals of the formula —CH$_2$—CH$_2$—, —CH$_2$—CH$_2$—CH$_2$— and —C(CH$_3$)HCH$_2$—. $R^3$ is preferably a radical of the formula —CH$_2$—CH$_2$—.

Examples of alkylene radicals $R^4$ are those of the formula —CH$_2$—, —CH(CH$_3$)—, —C(CH$_3$)$_2$—, —C(CH$_3$)(C$_2$H$_5$)—, —(CH$_2$)$_2$— and —(CH$_2$)$_4$—, the radical of the formula —CH$_2$— being preferred.

Examples of alkyl radicals R apply to alkyl radicals $R^6$. The methyl, ethyl and butyl radical are preferred.

Examples of radicals $R^6$ which are substituted by an ether oxygen atom are the methoxyethyl and the ethoxyethyl radical.

Examples of radicals $R^6$ which are substituted by a hydroxyl group are the hydroxybutyl and the hydroxyethyl radical.

Examples of radicals A are those of the formula

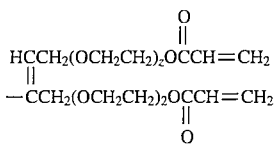

and

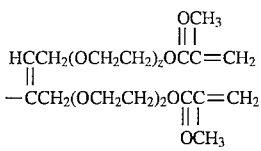

in which z has the meaning given above, and is preferably 1 or 2, more preferably 1.

Preferably, in formula (I) and (II), a is on average 0.0 1 to 1.0, b is on average 0.0 to 3.0, c is on average 0.0 to 3.0 and the sum a+b+c is preferably on average 0.1 to 4.0.

The organosilicon compounds according to the invention are preferably organopolysiloxanes.

Preferred organopolysiloxanes containing (meth)acryloxy groups are those of the formula

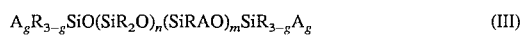

in which

A and R have the meaning given above, g is 0 or 1, n is 0 or an integer from 1 to 1500 and m is 0 or an integer from 1 to 100, with the proviso that the compounds contain at least one radical A per molecule.

The organosilicon compounds (I) employed in the processes according to the invention are preferably organopolysiloxanes. Those of the formula

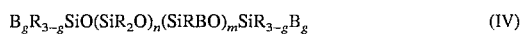

in which B, R, g, n and m have the meaning given above, and are preferably employed in the processes according to the invention.

Examples of radicals B are those of the formula

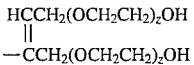

in which z has the meaning given above, and is preferably 1 or 2, more preferably 1.

Preparation of the organosilicon compounds (1) employed in the processes according to the invention are described in DE-A 40 32 006 and DD-A 255 737.

In these processes, alkoxylated alkynediols (5) of the formula

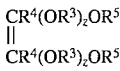

in which $R^3$, $R^4$ and $R^5$ have the meaning given above, are reacted with organosilicon compounds (6) containing at least one Si-bonded hydrogen atom per molecule in the presence of catalysts (7) which promote the addition of Si-bonded hydrogen onto an aliphatic multiple bond, so-called hydrosilylation catalysts.

Organosilicon compounds (6) containing at least one Si-bonded hydrogen atom per molecule which are preferably employed in the hydrosilylation reaction are those of the formula $$H_e R_f SiO_{\frac{4-(e+f)}{2}} , \qquad (V)$$

in which

R has the meaning given above, e is 0 or 1, on average 0.01 to 1.0, f is 0, 1, 2 or 3, on average 0.0 to 3.0 and the sum e+f is not greater than 3.

Organopolysiloxanes are preferably employed as the organosilicon compounds (6).

The organopolysiloxanes (6) containing at least one Si-bonded hydrogen atom preferably contain at least 0.01% by weight, preferably 0.1 to 1.6% by weight, of Si-bonded hydrogen and their average viscosity is 5 to 20,000 $mm^2 \cdot s^{-1}$ at 25° C., preferably 10 to 2,000 $mm^2 \cdot s^{-1}$ at 25° C., more preferably 10 to 300 $mm^2 \cdot s^{-1}$ at 25° C.

Organopolysiloxanes (6) containing at least one Si-bonded hydrogen atom per molecule which are preferably used in the hydrosilylation reaction are those of the formula $$H_h R_{3-h} SiO(SiR_2O)_o(SiRHO)_p SiR_{3-h} H_h \qquad (VI)$$

in which

R has the meaning given above, h is 0 or 1, o is 0 or an integer from 1 to 1500 and p is 0 or an integer from 1 to 100.

The alkoxylated alkynediols (5) are commercially obtainable, for example, under the name Golpanol BEO from BASF and have a considerably lower toxicity than volatile unsaturated alcohols, such as propargyl alcohol, or diols, such a but-2-yne-1,4-diol.

As a result of the preparation, and also depending on the alkoxylated alkynediol employed, z in the radical B can have an average value of between 1 and 4.

Alkoxylated alkynediols (5) are preferably employed in the hydrosilylation reaction in amounts such that 1 to 2 mole, preferably 1.05 to 1.20 mole, of alkynediol (5) are present per mole of Si-bonded hydrogen in the organosilicon compound (6).

The same catalysts employed to date for promoting addition of Si-bonded hydrogen onto an aliphatic multiple bond are employed in the hydrosilylation reaction as catalysts (7) which promote the addition of Si-bonded hydrogen onto an aliphatic multiple bond. The catalysts are preferably a metal from the group of platinum metals or a compound or a complex from the group of platinum metals. Examples of such catalysts are metallic and finely divided platinum, which can be on supports, such as silicon dioxide, aluminum oxide or active charcoal, and compounds or complexes of platinum, such as platinum halides, for example $PtCl_4$, $H_2PtCl_6 * 6H_2O$ or $Na_2PtCl_4 * 4H_2O$, platinum-olefin complexes, platinum-alcohol complexes, platinum-alcoholate complexes, platinum-ether complexes, platinum-aldehyde complexes, platinum-ketone complexes, including reaction products of $H_2PtCl_6 * 6H_2O$ and cyclohexanone, platinum-vinylsiloxane complexes, such as platinum-1,3-divinyl-1,1,3,3-tetramethyldisiloxane complexes with or without a content of detectable inorganically bonded halogen, bis-(gamma-picoline)-platinum dichloride, trimethylenedipyridine-platinum dichloride, dicyclopentadieneplatinum dichloride, dimethylsulfoxideethyleneplatinum(II) dichloride, cyclooctadiene-platinum dichloride, norbornadiene-platinum dichloride, gamma-picolineplatinum dichloride, cyclopentadiene-platinum dichloride and reaction products of platinum tetrachloride with olefin and primary amine or secondary amine or primary and secondary amine according to U.S. Pat. No. 4,292,434, such as the reaction product of platinum tetrachloride, dissolved in 1-octene, with sec-butylamine, or ammonium-platinum complexes according to EP-B 110 370.

The catalyst (7) is preferably employed in the hydrosilylation reaction in amounts of 2 to 200 ppm by weight (parts by weight per million parts by weight), preferably in amounts of 5 to 50 ppm by weight, calculated as elemental platinum and based on the total weight of alkynediol (5) and organosilicon compound (6).

Examples of the (meth)acrylic esters (2) employed in the process according to the invention are methyl methacrylate, ethyl methacrylate, butyl methacrylate, methyl acrylate, ethyl acrylate and butyl acrylate.

The same catalysts employed to date for promoting the transesterification can be employed as catalysts (3) which promote the transesterification in the process according to the invention. The catalysts are preferably the metals tin, titanium, aluminum and magnesium or a compound or a complex from the group of these metals. Examples of catalysts (3) which promote the transesterification are dibutyltin dichloride, monobutyltin trichloride, dibutyltin diacetate, dibutyltin dilaurate, tributyltin methoxide, dibutyltin dimethoxide, tetrabutyl titanate, Si/Al esters and $Mg[OC(O)CH_3]_2$. Hydrocarbons, such as cyclohexane or toluene, are preferably used as entraining agents for the volatile alcohol in the process according to the invention. Stabilizer additions are advantageous; free radical stoppers, such as phenothiazine, methoxyphenol, butylated hydroxytoluene, copper or copper compounds are preferably used.

0.5 to 12 mole of (meth)acrylic acid ester (2), preferably 0.5 to 6 mole of (meth)acrylic acid ester (2) and more preferably 1 to 3 mole of (meth)acrylic acid ester (2) are used per mole of hydroxyl group or $OR^5$ group in the radical B of the organosilicon compound (1) in the process according to the invention.

The same acid catalysts employed to date for promoting esterification can also be employed as acid catalysts (4) which promote the esterification in the process according to the invention.

The acid catalysts (4) are preferably proton acids, such as sulfuric acid, hydrogen chloride, phosphoric acid, trifluoromethanesulfonic acid and p-toluene-sulfonic acid, and so-called acid earths, such as Tonsil and KSF/O, which are commercially obtainable.

0.5 to 12 mole of (meth)acrylic acid, preferably 0.5 to 6 mole of (meth)acrylic acid and more preferably 1 to 3 mole of (meth)acrylic acid are preferably used per mole of hydroxyl group or $OR^5$ group in the radical B of the organosilicon compound (1) in the process according to the invention.

The catalysts (3) and (4) are preferably employed in amounts of 0.01% to 5% by weight, preferably in amounts of 0.1% to 2% by weight, based on the total weight of (meth)acrylic acid ester (2) or (meth)acrylic acid and organosilicon compound (1).

The processes according to the invention are preferably carried out under the pressure of the surrounding atmosphere, at about 1020 hPa (absolute). However, they can also be carried out under higher or lower pressures.

The processes according to the invention are preferably carried out at a temperature from 50° C. to 180° C., more preferably 80° C. to 150° C.

Inert organic solvents can be co-used in the processes according to the invention. Examples of inert organic solvents are toluene, xylene and octane isomers.

Furthermore, hydroxyl groups of the organosilicon compound (1) which have not been transesterified in the processes according to the invention can be further converted by carboxylating agents, such as acetic anhydride and diketene or vinyl ether, under acid catalysis.

Excess (meth)acrylic acid ester (2) or excess (meth)acrylic acid, excess carboxylating agent and any inert organic solvent used are preferably removed, preferably by distillation, from the organosilicon compounds containing (meth)acryloxy groups prepared by the processes according to the invention.

The organopolysiloxanes containing (meth)acryloxy groups obtained by the processes according to the invention can be equilibrated with organopolysiloxanes (8) chosen from the group consisting of linear organopolysiloxanes containing terminal triorganosiloxy groups, linear organopolysiloxanes containing terminal hydroxyl groups, cyclic organopolysiloxanes and copolymers of diorganosiloxane and monoorganosiloxane units.

Linear organopolysiloxanes containing terminal triorganosiloxy groups which are preferably employed are those of the formula $$R_3SiO(SiR_2O)_rSiR_3$$

in which

R has the meaning given above and r is 0 or an integer having a value from 1 to 1500, linear organopolysiloxanes containing terminal hydroxyl groups which are preferably employed are those of the formula $$HO(SiR_2O)_sH$$

in which

R has the meaning given above and s is an integer having a value from 1 to 1500, cyclic organopolysiloxanes which are preferably employed are those of the formula $$(R_2SiO)_t$$

in which

R has the meaning given above and t is an integer from 3 to 12, and copolymers which are preferably employed are those of units of the formula $$R_2SiO \text{ and } RSiO_{3/2}$$

in which R has the meaning given above.

The ratios of the amounts of organopolysiloxane (8) and organopolysiloxanes containing (meth)acryloxy groups employed in the equilibration optionally carried out are determined by the desired content of (meth)acrylic groups in the organopolysiloxanes produced by the equilibration optionally carried out, and by the average chain length desired.

Acid catalysts which promote the equilibration are preferably employed in the equilibration optionally carried out. Examples of such catalysts are sulfuric acid, phosphoric acid, trifluoromethanoic acid, phosphorus nitride chlorides and acid catalysts which are solid under the reaction conditions, such as acid-activated bleaching earth, acid zeolites, sulfonated charcoal and sulfonated styrene/divinylbenzene copolymer. Phosphorus nitride chlorides are preferred. Phosphorus nitride chlorides are preferably used in amounts of 5 to 1000 ppm (=parts per million) by weight, in particular 50 to 200 ppm by weight, based on the total weight of organosilicon compounds employed. The use of basic equilibration catalysts is possible, but is not preferred.

The equilibration optionally carried out is preferably carried out at 80° C. to 150° C. under the pressure of the surrounding atmosphere, under 1020 hPa (absolute). If desired, however, higher or lower pressures can also be applied. The equilibration is preferably carried out in 5% to 40% by weight, based on the total weight of the particular organosilicon compounds employed, of water-immiscible solvent, such as toluene.

The catalyst can be rendered inactive before the mixture obtained in the equilibration is worked up.

The processes according to the invention can be carried out batchwise, semi-continuously or completely continuously.

The invention furthermore relates to compositions which can be crosslinked by irradiation with light and comprise (A) organopolysiloxanes containing (meth)acryloxy groups and
(B) photosensitizers.

The compositions which can be crosslinked by irradiation with light are used for the production of coatings.

The organopolysiloxanes containing (meth)acryloxy groups according to the invention are crosslinked by ultraviolet light having wavelengths preferably in the range from 200 to 400 nm. The ultraviolet light can be produced, for example, in xenon, low pressure mercury, medium pressure mercury or high pressure mercury lmps. Light having a wavelength of 400 to 600 nm, or so-called "halogen light", is also suitable for crosslinking by means of light.

The energy sources suitable for crosslinking the organopolysiloxanes according to the invention can also be, X-ray, gamma or electron beams or may involve the simultaneous use of at least two different types of such beams. In addition to the high-energy radiation, a heat supply, including a heat supply by means of infrared light, can be used. However, such a heat supply is not necessary and is preferably omitted in order to reduce expenditure on energy.

Suitable photosensitizers are optionally substituted acetophenones, propiophenones, benzophenones, anthraquinones, benzils, carbazoles, xanthones, thioxanthones, fluorenes, fluoroenones, benzoins, naphthalenesulfonic acids, benzaldehydes and cinnamic acids.

Examples of these are fluorenone, fluorene and carbazole; acetophenone; substituted acetophenones, such as 3-methylacetophenone, 2,2'-dimethoxy-2-phenylacetophenone, 4-methylacetophenone, 3-bromoacetophenone, 4-allylacetophenone, p-diacetylbenzene and p-tert-butyltrichloroacetophenone; propiophenones; substituted propiophenones, such as 1-[4-(methylthio)phenyl]-2-morpholino-1-propanone; benzophenone; substituted benzophenones, such as Michler's ketone, 3-methoxybenzophenone, 4,4'-dimethylamonobenzophenone, 4-methylbenzophenone, 4-chlorobenzophenone, 4,4'-dimethoxybenzophenone and 4-chloro-4'-benylbenzophenone; xanthone; substituted xanthones, such as 3-chloroxanthone, 3,9-dichloroxanthone and 3-chloro-8-nonylxanthone; thioxanthone; substituted thioxanthones, such as isopropylthioxanthone; anthraquinone; substituted anthraquinones, such as chloroanthraquinone and anthraquinone 1,5-disulfonic acid disodium salt; benzoin;

substituted benzoins, such as benzoin methyl ether; benzil; 2-naphthalenesulfonyl chloride; benzaldehyde; and cinnamic acid.

Photosensitizers are preferably employed in the compositions according to the invention in amounts of 0.01% to 10% by weight, in particular 0.5% to 5% by weight, based on the total weight of organopolysiloxanes to be crosslinked.

Examples of surfaces onto which the coatings according to the invention can be applied are those of paper, wood, cork, films of plastic, for example polyethylene films or polypropylene films, ceramic objects, glass, including glass fibers, metals, pasteboards, including those of asbestos, and woven and nonwoven cloth of natural or synthetic organic fibers. The coatings according to the invention are used, for example, in the coating of release paper.

The compositions according to the invention which can be crosslinked by irradiation with light can be applied in any desired manner which is suitable and in many cases known for the production of coatings from liquid substances, for example by dipping, brushing, pouring, spraying, rolling on, printing, for example by means of an offset gravure coating device, and knife or doctor blade coating, to the surfaces to be coated.

All the transesterification reactions or esterification reactions (Examples 1b, 2b, 3b, 4b, 5b, 6b and 7) are carried out with addition of 100 ppm of phenothiazine, based on the total weight of the starting materials.

EXAMPLE 1 a) 125 g (0.63 mole of C≡C triple bond) of an ethoxylated 2-butynediol (commercially obtainable under the tradename "Golpanol BEO" from BASF) and 63.6 g (0.55 mole) of n-butyl acetate are heated to 80° C. under a nitrogen atmosphere. 716 µl of a 1% strength by weight (based on pure platinum) toluene solution of a divinyltetramethyldisiloxaneplatinum complex with platinum in the oxidation state of zero are then metered in such that the platinum content is 20 ppm, based on the pure metal, and the mixture is heated to 125° C. 186.7 g (0.34% by weight of hydrogen) of an α,ω-dihydridopolydimethylsiloxane having a viscosity of 3.5 $mm^2 \cdot s^{-1}$ at 25° C. are added dropwise in the course of 2.5 hours. After a further reaction time of 2 hours, the reaction solution is filtered and the filtrate is concentrated to constant weight on a rotary evaporator at 100° C. under a high vacuum.

268 g (86% of theory) of a red-brown, clear oil are obtained (VS I).

b) 25 g of VS I, the preparation of which is described above under a), 9.68 g (0.112 mole) of methyl acrylate, 0.139 g (0.396×10$^{-3}$ mole) of dibutyltin diacetate and 10 g (0.109 mole) of toluene are introduced into the reaction vessel at room temperature under nitrogen and are then heated to 95° C. The temperature is maintained for 30 minutes and then increased at a heating rate of 1° C. for 10 minutes. The methanol/toluene azeotrope distills off at 63.8° C. After a reaction time of 5 hours, the reaction solution is filtered and the filtrate is concentrated to constant weight under a high vacuum at 90° C.

27.22 g (81.2% of theory) of a clear orange-brown oil are obtained (AC I).

EXAMPLE 2 a) 15 g (0.076 mole of C≡C triple bond) of "Golpanol BEO" and 35.4 g (0.3 mole) of n-butyl acetate are heated to 80° C. under a nitrogen atmosphere. 339 µl of the platinum catalyst described in Example 1 (20 ppm of Pt) are then metered in and the mixture is heated to 125° C. 158.7 g (0.048% by weight of hydrogen) of an α,ω-dihydridopolydimethylsiloxane having a viscosity of 69 $mm^2 \cdot s^{-1}$ at 25° C. are added dropwise in the course of 3 hours. After a stirring time of an additional hour, the reaction solution is filtered and the filtrate is concentrated to constant weight on a rotary evaporator at 100° C. under a high vacuum.

136.8 g (78.8% of theory) of a pale yellow opalescent oil are obtained (VS II).

b) 25 g of VS II, the preparation of which is described above under a), 23.77 g (0.276 mole) of methyl acrylate, 0.201 g (0.318×10$^{-3}$ mole) of dibutyltin dilaurate and 10 g (0.1085 mole) of toluene are introduced into the reaction vessel at room temperature under a nitrogen atmosphere and are then heated to 85° C. The temperature is maintained for 30 minutes and then increased at a heating rate of 1° C. for 10 minutes. The methanol/toluene azeotrope distills off at 63.8° C. After a reaction time of 5 hours, the reaction solution is filtered and the filtrate is concentrated to constant weight under a high vacuum at 80° C. 25.84 g (78.49% of theory) of an orange oil are obtained (AC II).

EXAMPLE 3 a) 90 g (0.45 mole of C≡C triple bond) of "Golpanol BEO" and 65 g (0.56 mole) of n-butyl acetate are heated to 80° C. under a nitrogen atmosphere. 732 µl (20 ppm of Pt) of the platinum catalyst described in Example 1 are then metered in and the mixture is heated to 125° C. 228.5 g (0.20% by weight of hydrogen) of an α,ω-dihydridopolydimethylsiloxane having a viscosity of 6.6 $mm^2 \cdot s^{-1}$ at 25° C. are added dropwise in the course of 2.5 hours. After a reaction time of an additional hour, the reaction solution is filtered and the filtrate is concentrated to constant weight on a rotary evaporator at 100° C. under a high vacuum.

251.8 g (79.1% of theory) of a yellow, clear oil are obtained (VS III).

b) 25 g of VS III, the preparation of which is described above under a), 5.48 g (0.043 mole) of butyl acrylate, 0.122 g (0.348×10$^{-3}$ mole) of dibutyltin diacetate and 10 g (0.109 mole) of toluene are introduced into the reaction vessel at room temperature under a nitrogen atmosphere and are then heated up to 110° C. The temperature is maintained for 30 minutes and then increased at a heating rate of 1° C. per minute. The butanol/toluene azeotrope distills off at 105.5° C. After a reaction time of 5 hours, the reaction solution is filtered and the filtrate is concentrated to constant weight under a high vacuum at 80° C. 26.04 g (90.92% of theory) of an orange oil are obtained (AC III).

EXAMPLE 4 a) 70 g (0.35 mole of C≡C triple bond) of "Golpanol BEO" and 66.1 g (0.57 mole) of n-butyl acetate are heated to 80° C. under a nitrogen atmosphere. 744 µl (20 ppm of Pt) of the platinum catalyst described in Example 1 are then added and the mixture is heated to 125° C. 253.8 g (0.14% by weight of hydrogen) of an equilibrate of dimethylsiloxy, methylhydridosiloxy and trimethylsiloxy units having a viscosity of 73 $mm^2 \cdot s^{-1}$ at 25° C. are metered in over a period of 2.5 hours. After a reaction time of 10 hours, the reaction solution is filtered and the filtrate is concentrated to constant weight on a rotary evaporator at 100° C. under a high vacuum.

224.5 g (69.3% of theory) of a yellow, clear oil are obtained (VS IV).

b) 25 g of VS IV, the preparation of which is described above under a), 20.83 g (0.242 mole) of methyl acrylate, 0.367 g (0.108×10$^{-2}$ mole) of tetrabutyl orthotitanate and 10 g (0.109 mole) of toluene are introduced into the reaction vessel at room temperature under a nitrogen atmosphere and are then heated to 87° C. The temperature is maintained for 30 minutes and then increased at a heating rate of 1° C. per 10 minutes. The methanol/toluene azeotrope distills off at 63.8° C. After a reaction time of 5 hours, the reaction solution is filtered and concentrated to constant weight under a high vacuum at 80° C.

24.92 g (78.0% of theory) of an orange oil are obtained (AC IV).

EXAMPLE 5 a) 27.3 g (0.138 mole of C≡C triple bond) of "Golpanol BEO" and 65.8 g (0.57 mole) of n-butyl acetate are heated to 80° C. under a nitrogen atmosphere. 739 μl (20 ppm of Pt) of the platinum catalyst described in Example 1 are then metered in and the mixture is heated to 125° C. 294.7 g (0.047% by weight of hydrogen) of an equilibrate of dimethylsiloxy, methylhydridosiloxy and trimethylsiloxy units having a viscosity of 110 mm$^2$/s at 25° C. are added dropwise in the course of 3 hours. After a reaction time of 1 hour, the reaction solution is filtered and the filtrate is concentrated to constant weight on a rotary evaporator at 100° C. under a high vacuum.

260.4 g (80.9% of theory) of a pale yellow, clear oil are obtained (VS V).

b) 25 g of VS V, the preparation of which is described above under a), 10.54 g (0.123 mole) of methyl acrylate, 0.142 g (0.405×10$^{-3}$ mole) of dibutyltin diacetate and 10 g (0.109 mole) of toluene are introduced into the reaction vessel at room temperature under a nitrogen atmosphere and are then heated to 90° C. The temperature is maintained for 30 minutes and then increased at a heating rate of 1° C. per 10 minutes. The methanol/toluene azeotrope distills off at 63.8° C. After a reaction time of 4 hours, the reaction solution is filtered and the filtrate is concentrated to constant weight under a high vacuum at 80° C. 26.52 g (93% of theory) of a pale yellow oil are obtained (AC V).

EXAMPLE 6 a) 70 g (0.35 mole of C≡C triple bond) of "Golpanol BEO" and 58.2 g (0.5 mole) of n-butyl acetate are heated to 80° C. under a nitrogen atmosphere. 656 μl (20 ppm of Pt) of the platinum catalyst described in Example 1 are then metered in and the mixture is heated to 125° C. 215.4 g (0.165% by weight of hydrogen) of an equilibrate of dimethylsiloxy, methylhydridosiloxy and dimethylhydridosiloxy units having a viscosity of 148 mm$^2 \cdot$s$^{-1}$ at 25° C. are added dropwise in the course of 3 hours. After a reaction time of 2 hours, the reaction solution is filtered and the filtrate is concentrated to constant weight on a rotary evaporator at 100° C. under a high vacuum.

194 g (68% of theory) of a yellow, clear oil are obtained (VS VI).

b) 25 g of VS VI, the preparation of which is described above under a), 27.28 g (0.272 mole) of ethyl acrylate, 0.21 g (0.596×10$^{-3}$ mole) of dibutyltin diacetate and 15 g (0.163 mole) of toluene are introduced into the reaction vessel at room temperature under a nitrogen atmosphere and are then heated to 102° C. The temperature is maintained for 30 minutes and then increased at a heating rate of 1° C. per 15 minutes. The ethanol/toluene azeotrope distills off at 76.8° C. After a reaction time of 4 hours, the reaction solution is filtered and the filtrate is concentrated to constant weight under a high vacuum at 80° C. 31.3 g (91.8% of theory) of an orange oil are obtained (AC VI).

EXAMPLE 7

25 g of VS III, the preparation of which is described in Example 3a), 1.254 g (0.0174 mole) of acrylic acid, 0.0054 g (0.245×10$^{-4}$ mole) of butylated hydroxy toluene, 0.5 g of an acid-activated bleaching earth obtainable under the tradename KSF/O and 8.7 g (0.0944 mole) of toluene are introduced into the reaction vessel at room temperature, while passing in nitrogen, and then heated to 115° C. The batch is stirred at 115° C. for 2 hours, a further 0.5 g of KSF/O being added after 1 hour. The water/toluene azeotrope is driven off with the stream of nitrogen. When the reaction time has ended, the reaction solution is filtered and the filtrate is concentrated to constant weight under a high vacuum at 80° C.

20.22 g (78.26% of theory) of an orange oil are obtained.

EXAMPLE 8

10 g of AC V, the preparation of which is described in Example 5b), and 0.012 g (0.94×10$^{-4}$ mole) of dimethylaminopyridine are introduced into the reaction vessel under a nitrogen atmosphere at 50° C. 1.97 g (0.0234 mole) of diketene and 10 g (0.1085 mole) of toluene are slowly added dropwise. The mixture is then stirred at 65° C. for 1 hour and filtered and the reaction solution is concentrated to constant weight under a high vacuum at 80° C.

11.03 g (92.1% of theory) of a reddish, clear oil are obtained.

EXAMPLE 9

2 g of AC I, the preparation of which is described in Example 1b), are mixed with 0.06 g (3.65×10$^{-4}$ mole) of the photosensitizer with the tradename Darocure® 1173 (commercially obtainable from Ciba-Geigy) and the mixture is applied in a layer thickness of 20 μm to a polyethylene film using a doctor blade. The polymer is crosslinked in 2 seconds by irradiation with a medium pressure mercury lamp with an output of 80 mW/cm$^2$ at a distance of 10 cm under a nitrogen atmosphere. The surface of the coating is non-tacky.

EXAMPLE 10

2 g of AC IV, the preparation of which is described in Example 4b), are mixed with 0.06 g (2.0×10$^{-4}$ mole) of the photosensitizer with the tradename Irgacure® 369 (commercially obtainable from Ciba-Geigy) in 0.5 g of toluene and the mixture is applied in a layer thickness of 20 μm to a paper with the tradename Bosso Buxil using a doctor blade. The polymer is crosslinked in 4 seconds by irradiation with a medium pressure mercury lamp with an output of 80 mW/cm$^2$ at a distance of 10 cm under a nitrogen atmosphere. The surface of the coating is non-tacky.

EXAMPLE 11

2 g of AC VI, the preparation of which is described in Example 6b), are mixed with 0.06 g (3.65×10$^{-4}$ mole) of the photosensitizer with the tradename Darocure® 1173 and the mixture is applied in a layer thickness of 2 μm to a polypropylene film using a doctor blade. The polymer is crosslinked in 2 seconds by irradiation with a medium pressure mercury lamp with an output of 80 mW/cm² at a distance of 10 cm under a nitrogen atmosphere. The surface of the coating is non-tacky.

EXAMPLE 12

25 g of VS I, the preparation of which is described in Example 1a), 25.62 g (0.2976 mole) of methyl acrylate, 0.405 g (0.1154×10⁻² mole; corresponding to 0.8% by weight of the total batch) of dibutyltin dicetate and 10 g (0.109 mole) of toluene are introduced into the reaction vessel at room temperature under a nitrogen atmosphere and are heated together to 90° C. The temperature is maintained for 30 minutes and is then increased to 100° C. with a heating rate of 1° C. per 10 minutes and subsequently to 140° C. with a heating rate of 1° C. per 3.75 minutes. The methanol/toluene azeotrope distills off at 63.8° C. After a reaction time of 4 hours, the mixture is concentrated to constant weight under a high vacuum at 80° C.

28.22 g (92.95% of theory) of a clear, brown oil having the structure

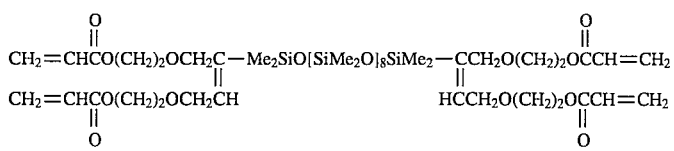

with 52% of acrylic acid ester groups, based on the original hydroxyl groups, are obtained.

COMPARISON EXAMPLE 1 (DD-A 298 404)

a) 360 g (4.2 mole) of 2-butyne-1,4-diol and 80 g (0.68 mole) of n-butyl acetate are heated to 60° C. under a nitrogen atmosphere. 0.075 g of the platinum catalyst described in Example 1 are metered in, so that the platinum content is 10 ppm, based on the pure metal. 1290 g (0.31% by weight of hydrogen) of an α,ω-dihydridopolydimethylsiloxane having a viscosity of 4.5 mm²/s at 25° C. are then added dropwise in the course of 1.25 hours. After a reaction time of an additional hour, the mixture is concentrated to constant weight on a rotary evaporator at 80° C. under a high vacuum. 1586 g (96.1% of theory) of a yellow clear oil (VS VII) having a viscosity of 300 mm²/s at 25° C. are obtained.

b) 25 g of VS VII, the preparation of which is described above under a), 34.03 g (0.3953 mole) of methyl acrylate, 0.472 g (0.1345×10⁻² mole; corresponding to 0.8% by weight of the total batch) of dibutyltin diacetate and 10 g (0.109 mole) of toluene are introduced into the reaction vessel at room temperature under a nitrogen atmosphere and are heated together to 90° C. The temperature is maintained for 30 minutes and then increased to 100° C. at a heating rate of 1° C. per 10 minutes and subsequently to 140° C. at a heating rate of 1° C. per 3.75 minutes. The methanol/toluene azeotrope distills off at 63.8° C. After a reaction time of 4 hours, the mixture is concentrated to constant weight under a high vacuum at 80° C.

28.15 g (87.61% of theory) of a clear, orange oil having the structure

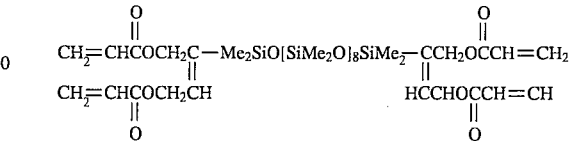

(Me = methyl group)

with 42% of acrylic acid ester groups, based on the original hydroxyl groups, are obtained (AC VII).

A lower conversion of acrylic acid ester groups than in Example 12 is achieved during the preparation.

EXAMPLE 13

25 g of VS I, the preparation of which is described in Example 1a), 25.62 g (0.2976 mole) of methyl acrylate, 0.304 g (0.866×10⁻³ mole) of dibutyltin diacetate and 10 g (0.109 mole) of toluene are introduced into the reaction vessel at room temperature under a nitrogen atmosphere and are heated together to 90° C. The temperature is maintained for 30 minutes and is then increased to 100° C. at a heating rate of 1° C. per 10 minutes and subsequently to 140° C. at a heating rate of 1° C. per 3.75 minutes. The methanol/toluene azeotrope distills off at 63.8° C. After a reaction time of 4 hours, the mixture is concentrated to constant weight under a high vacuum at 80° C.

27.26 g (89.8% of theory) of a clear, brown oil having the structure

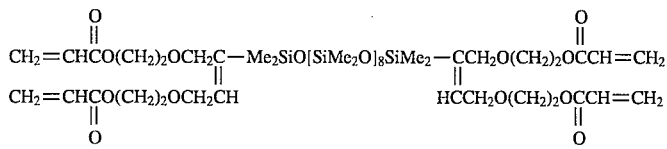

(Me = methyl group)

with 42% of acrylic acid ester groups, based on the original hydroxyl groups, are obtained (AC VIII).

EXAMPLE 14

3% by weight of Darocure 1173 is added to AC VIII, the preparation of which is described in Example 13, and the mixture is measured with a DPA 7 from Perkin-Elmer under a nitrogen atmosphere at 25° C. and a light output of 150 mW/cm$^2$. A reaction enthalpy of –70 J/g is obtained for AC VIII.

COMPARISON EXAMPLE 2 (DD-A 298 404)

The procedure of Example 14 is repeated, with the modification that AC VII, the preparation of which is described in Comparison Example 1b), is employed instead of AC VIII.

A reaction enthalpy of –65 J/g is obtained for AC VII, i.e., compared with Example 14, fewer acrylate groups react and the conversion during crosslinking is therefore lower.

EXAMPLE 15

20% by weight of a mixture of 80 parts of Darocure 1173 and 20 parts of Irgacure 369 is added to AC VIII, the preparation of which is described in Example 13, and the mixture is stirred, the AC VIII mixture remaining clear.

COMPARISON EXAMPLE 3

The procedure of Example 15 is repeated with the modification that AC VII, the preparation of which is described in Comparison Example 1b), is employed instead of AC VIII.

The AC VII mixture becomes cloudy within a few minutes. In comparison with Example 15, the photosensitizers are not readily soluble in the polymer.

EXAMPLE 16

25 g of VS I, the preparation of which is described in Example 1a), 25.62 g (0.2976 mole) of methyl acrylate, 3.59 g (0.01055 mole) of tetrabutyl orthotitanate and 10 g (0.109 mole) of toluene are introduced into the reaction vessel at room temperature under a nitrogen atmosphere and are heated together to 90° C. The temperature is maintained for 30 minutes and is then increased to 100° C. with a heating rate of 1° C. per 10 minutes and then to 140° C. with a heating rate of 1° C. per 3.75 minutes. The methanol/toluene azeotrope distills off at 63.8° C. After a reaction time of 4 hours, the mixture is concentrated to constant weight under a high vacuum at 80° C. 30.04 g (98.9% of theory) of a clear, brown oil with 89.4% of acrylic acid ester groups, based on the original hydroxyl groups, are obtained.

5 g of the product are introduced into the reaction vessel with 0.211 g (0.2103×10$^{-2}$ mole) of butyl vinyl ether, 146.38 µl (25 ppm) of para-toluenesulfonic acid (0.1% strength in tetrahydrofuran) and 5 g (0.0693 mole) of tetrahydrofuran at room temperature under a nitrogen atmosphere and the mixture is then stirred at 40° C. for 45 minutes. The solution is subsequently concentrated to constant weight under a high vacuum at 80° C.

4.88 g (97.6% of theory) of a clear, brown oil are obtained.

What is claimed is:

1. An organosilicon compound containing (meth)acryloxy groups with units of the formula $$A_aR_bSiX_cO_{\frac{4-(a+b+c)}{2}}, \quad (I)$$

in which

R is identical or different and is a monovalent, optionally halogenated hydrocarbon radical having 1 to 18 carbon atom(s) per radical, X is identical or different and is a chlorine atom or a radical of the formula —OR$^1$, in which R$^1$ is an alkyl radical having 1 to 8 carbon atom(s) per radical, which can be substituted by an ether oxygen atom, a is 0 or 1, b is 0, 1, 2 or 3, c is 0, 1, 2 or 3 and the sum a+b+c≦4 and

A is a radical of the formula

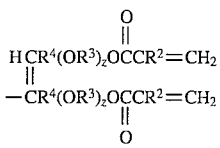

in which z is 1, 2, 3 or 4,

R$^2$ is a hydrogen atom or a methyl radical,

R$^3$ is a linear or branched alkylene radical having 1 to 6 carbon atom(s) per radical and R$^4$ is a linear or branched alkylene radical having 1 to 6 carbon atom(s) per radical, with the proviso that the compounds contain at least one radical A per molecule.

2. An organosilicon compound containing (meth)acryloxy groups as claimed in claim 1, which is an organopolysiloxane of the formula $$A_gR_{3-g}SiO(SiR_2O)_n(SiRAO)_mSiR_{3-g}A_g \quad (III)$$

in which

R is identical or different and is a monovalent, optionally halogenated hydrocarbon radical having 1 to 18 carbon atom(s) per radical, A is a radical of the formula

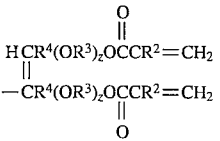

in which z is 1, 2, 3 or 4,

R$^2$ is a hydrogen atom or a methyl radical,

R$^3$ is a linear or branched alkylene radical having 1 to 6 carbon atom(s) per radical and R$^4$ is a linear or branched alkylene radical having 1 to 6 carbon atom(s) per radical, g is 0 or 1, n is 0 or an integer from 1 to 1500 and m is 0 or an integer from 1 to 100, with the proviso that the compound contains at least one radical A per molecule.

3. An organosilicon compound containing (meth)acryloxy groups as claimed in claim 1 or 2, in which A is a radical of the formula

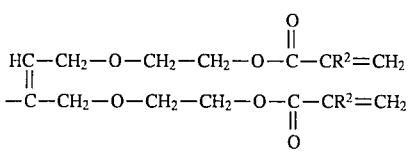

in which $R^2$ is a hydrogen atom or a methyl radical.

4. A process for the preparation of an organosilicon compound containing (meth)acryloxy groups of the formula $$A_aR_bSiX_cO_{\frac{4-(a+b+c)}{2}}, \quad (I)$$

in which

R is identical or different and is a monovalent, optionally halogenated hydrocarbon radical having 1 to 18 carbon atom(s) per radical, X is identical or different and is a chlorine atom or a radical of the formula $-OR^1$, in which $R^1$ is an alkyl radical having 1 to 8 carbon atom(s) per radical, which can be substituted by an ether oxygen atom, a is 0 or 1, b is 0, 1, 2 or 3, c is 0, 1, 2 or 3 and the sum $a+b+c \leq 4$ and

A is a radical of the formula

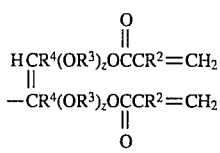

in which z is 1, 2, 3 or 4, $R^2$ is a hydrogen atom or a methyl radical, $R^3$ is a linear or branched alkylene radical having 1 to 6 carbon atom(s) per radical and $R^4$ is a linear or branched alkylene radical having 1 to 6 carbon atom(s) per radical, with the proviso that the compounds contain at least one radical A per molecule which comprises reacting an organosilicon compound (1) with units of the formula $$B_aR_bSiX_cO_{\frac{4-(a+b+c)}{2}}, \quad (II)$$

in which

R is identical or different and is a monovalent, optionally halogenated hydrocarbon radical having 1 to 18 carbon atom(s) per radical, X is identical or different and is a chlorine atom or a radical of the formula $-OR^1$, in which $R^1$ is an alkyl radical having 1 to 8 carbon atom(s) per radical, which can be substituted by an ether oxygen atom, a is 0 or 1, b is 0, 1, 2 or 3, c is 0, 1, 2 or 3 and the sum $a+b+c \leq 4$ and

B is a radical of the formula

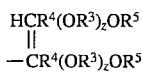

in which $R^3$ is a linear or branched alkylene radical having 1 to 6 carbon atom(s) per radical, $R^4$ is a linear or branched alkylene radical having 1 to 6 carbon atom(s) per radical and $R^5$ is a hydrogen atom, a trimethylsilyl group or a tertiary butyl group, with the proviso that the compounds contain at least one radical B per molecule, with (meth)acrylic acid esters (2) of the formula

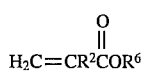

in which $R^2$ is a hydrogen atom or a methyl radical and $R^6$ is a monovalent hydrocarbon radical having 1 to 12 carbon atom(s) per radical, which can be substituted by an ether oxygen atom or a hydroxyl group, in the presence of catalysts (3) which promote the transesterification.

5. A process for the preparation of an organosilicon compound containing (meth)acryloxy groups of the formula $$A_aR_bSiX_cO_{\frac{4-(a+b+c)}{2}}, \quad (I)$$

in which

R is identical or different and is a monovalent, optionally halogenated hydrocarbon radical having 1 to 18 carbon atom(s) per radical, X is identical or different and is a chlorine atom or a radical of the formula $-OR^1$, in which $R^1$ is an alkyl radical having 1 to 8 carbon atom(s) per radical, which can be substituted by an ether oxygen atom, a is 0 or 1, b is 0, 1, 2 or 3, c is 0, 1, 2 or 3 and the sum $a+b+c \leq 4$ and

A is a radical of the formula

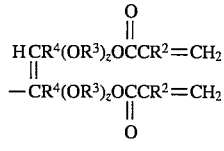

in which z is 1, 2, 3 or 4, $R^2$ is a hydrogen atom or a methyl radical, $R^3$ is a linear or branched alkylene radical having 1 to 6 carbon atom(s) per radical and $R^4$ is a linear or branched alkylene radical having 1 to 6 carbon atom(s) per radical, with the proviso that the compounds contain at least one radical A per molecule which comprises esterifying an organosilicon compound (1) with units of the formula $$B_aR_bSiX_cO_{\frac{4-(a+b+c)}{2}}, \quad (II)$$

in which

R is identical or different and is a monovalent, optionally halogenated hydrocarbon radical having 1 to 18 carbon atom(s) per radical, X is identical or different and is a chlorine atom or a radical of the formula $-OR^1$, in which $R^1$ is an alkyl radical having 1 to 8 carbon atom(s) per radical, which can be substituted by an ether oxygen atom, a is 0 or 1, b is 0, 1, 2 or 3, c is 0, 1, 2 or 3 and the sum $a+b+c \leq 4$ and

B is a radical of the formula $$\begin{matrix} HC-R^4-(OR^3)_2OR^5 \\ \parallel \\ -C-R^4-(OR^3)_2OR^5 \end{matrix}$$

in which z is 1, 2, 3 or 4, $R^3$ is a linear or branched alkylene radical having 1 to 6 carbon atom(s) per radical and $R^4$ is a linear or branched alkylene radical having 1 to 6 carbon atom(s) per radical, $R^5$ is a hydrogen atom, a trimethylsilyl group or a tertiary butyl group, with the proviso that the compounds contain at least one radical B per molecule, with a (meth)acrylic acid in the presence of an acid catalyst (4).

6. The process of claim 4, further comprising reacting said organosilicon compound containing (meth)acryloxy groups with a carboxylating agent or with a vinyl ether under acid catalysis.

7. The process of claim 5, further comprising reacting said organosilicon compound containing (meth)acryloxy groups with a carboxylating agent or with a vinyl ether under acid catalysis.

8. A composition which crosslinks by irradiation with light and comprises (A) an organopolysiloxane containing (meth)acryloxy groups as claimed in claim 1, and (B) a photosensitizer.

9. A coating comprising the composition of claim 7.

* * * * *